United States Patent
Kasperchik et al.

(12) 
(10) Patent No.: US 7,514,198 B2
(45) Date of Patent: Apr. 7, 2009

(54) COLOR FORMING COMPOSITION CONTAINING A PLURALITY OF ANTENNA DYES

(75) Inventors: Vladek Kasperchik, Corvallis, OR (US); Cari L. Dorsh, McMinnville, OR (US); Makarand P. Gore, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 354 days.

(21) Appl. No.: 11/204,831

(22) Filed: Aug. 15, 2005

(65) Prior Publication Data
US 2007/0037088 A1 Feb. 15, 2007

(51) Int. Cl.
*G03F 7/00* (2006.01)
*G03F 7/004* (2006.01)

(52) U.S. Cl. ............... 430/270.1; 430/138; 430/905; 430/913

(58) Field of Classification Search .......... 430/270.1, 430/138, 905, 913
See application file for complete search history.

(56) References Cited

U.S. PATENT DOCUMENTS

| | | | |
|---|---|---|---|
| 4,598,035 A | * | 7/1986 | Usami et al. ............... 503/213 |
| 5,945,247 A | * | 8/1999 | Shimada .................... 430/138 |
| 6,015,896 A | | 1/2000 | Mistry et al. |
| 6,025,486 A | | 2/2000 | Mistry et al. |
| 6,265,344 B1 | | 7/2001 | Shimbo et al. |
| 6,329,120 B1 | * | 12/2001 | Obayashi et al. ......... 430/270.1 |

FOREIGN PATENT DOCUMENTS

| | | |
|---|---|---|
| EP | 0716135 B1 | 9/1999 |
| WO | 2004/067289 | 8/2004 |
| WO | 2004/067653 | 8/2004 |

OTHER PUBLICATIONS

PCT International Search Report; Patent Application No. PCT/US2006/062322; filed Dec. 19, 2006; Report issued Sep. 5, 2007.

* cited by examiner

*Primary Examiner*—Amanda C. Walke

(57) ABSTRACT

A radiation image-able coating includes a first phase including a radiation curable polymer matrix and an activator disposed in the radiation curable polymer matrix, a second phase insolubly distributed in the first phase, the second phase including a color-former, and a hybrid antenna dye package distributed in at least one of the first and second phase, wherein the hybrid antenna dye package includes at least a first antenna dye having a high extinction coefficient and a second antenna dye having a low extinction coefficient.

30 Claims, 5 Drawing Sheets

COLOR FORMING COMPOSITION CONTAINING A PLURALITY OF ANTENNA DYES

BACKGROUND

Compositions that produce a color change upon exposure to energy in the form of light or heat are of great interest in generating images on a variety of substrates. For example, data storage media provide a convenient way to store large amounts of data in stable and mobile formats. For example, optical discs, such as compact discs (CDs), digital video disks (DVDs), or other discs allow a user to store relatively large amounts of data on a single relatively small medium. Traditionally, commercial labels were frequently printed onto optical discs by way of screen printing or other similar methods to aid in identification of the contents of the disk.

Current efforts have been directed to providing consumers with the ability to store data on optical disks using drives configured to burn data on recordable compact discs (CD-R), rewritable compact discs (CD-RW), recordable digital video discs (DVD-R), rewritable digital video discs (DVD-RW), and combination drives containing a plurality of different writeable drives, to name a few. The optical disks used as storage mediums frequently have two sides: a data side configured to receive and store data and a label side. The label side is traditionally a background on which the user hand writes information to identify the disc.

Recent developments have provided for the imaging of a dye-containing coating with the lasers of commercially available optical disk drives. However, dyes used in traditional image-able coatings have either had high radiation absorption efficiency and low fade resistance, or low radiation absorption efficiency with high fade resistance and stability.

SUMMARY

A radiation image-able coating includes a first phase including a radiation curable polymer matrix and an activator disposed in the radiation curable polymer matrix as well as a second phase insolubly distributed in the first phase, the second phase including a color-former, and a hybrid antenna dye package distributed in at least one of the first and second phase, wherein the hybrid antenna dye package includes at least a first antenna dye having a high extinction coefficient and a second antenna dye having a low extinction coefficient.

Additionally, according to one exemplary embodiment, a method for forming a radiation image-able coating includes preparing a radiation-curable polymer matrix including an acidic activator species, forming a low-melting eutectic of a leuco-dye phase, distributing the low-melting eutectic of a leuco-dye phase in the polymer matrix, and sensitizing the radiation imageable coating with a hybrid antenna dye package, the hybrid antenna dye package including at least a first antenna dye having a high extinction coefficient and a second antenna dye having a high extinction coefficient.

BRIEF DESCRIPTION OF THE DRAWINGS

The accompanying drawings illustrate various embodiments of the present system and method and are a part of the specification. The illustrated embodiments are merely examples of the present system and method and do not limit the scope of the disclosure.

Throughout the drawings, identical reference numbers designate similar, but not necessarily identical, elements.

DETAILED DESCRIPTION

The present exemplary systems and methods provide for the preparation of a two-phase radiation image-able thermochromic coating having improved marking sensitivity and shelf-life reliability. In particular, a radiation-curable radiation imageable coating is described herein that can be imaged with a radiation generating device while exhibiting high marking sensitivity combined with relatively good shelf-life reliability. According to one exemplary embodiment, the present two-phase radiation image-able thermochromic coating has two or more antenna dyes dispersed and/or dissolved in various phases of the coating, a first of the two or more antenna dyes exhibits a high radiation absorbance due to a high extinction coefficient, and a second of the two or more antenna dyes exhibits a robust fade resistance and generally good stability, which very often comes at expense of significantly lower extinction coefficient. Further details of the present coating, as well as exemplary methods for forming the coatings on a desired substrate will be described in further detail below.

As used in the present specification, and in the appended claims, the term "radiation image-able discs" is meant to be understood broadly as including, but in no way limited to, audio, video, multi-media, and/or software disks that are machine readable in a CD and/or DVD drive, or the like. Non-limiting examples of radiation image-able disc formats include, writeable, recordable, and rewriteable disks such as DVD, DVD-R, DVD-RW, DVD+R, DVD+RW, DVD-RAM, CD, CD-ROM, CD-R, CD-RW, and the like.

For purposes of the present exemplary systems and methods, the term "color" or "colored" refers to absorbance and reflectance properties that are preferably visible, including properties that result in black, white, or traditional color appearance. In other words, the terms "color" or "colored" includes black, white, and traditional colors, as well as other visual properties, e.g., pearlescence, reflectivity, translucence, transparency, etc.

In the following description, for purposes of explanation, numerous specific details are set forth in order to provide a thorough understanding of the present systems and methods for forming a two-phase radiation image-able coating with improved marking sensitivity and shelf-life reliability. It will be apparent, however, to one skilled in the art that the present systems and methods may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

Exemplary Structure

Figure 1:
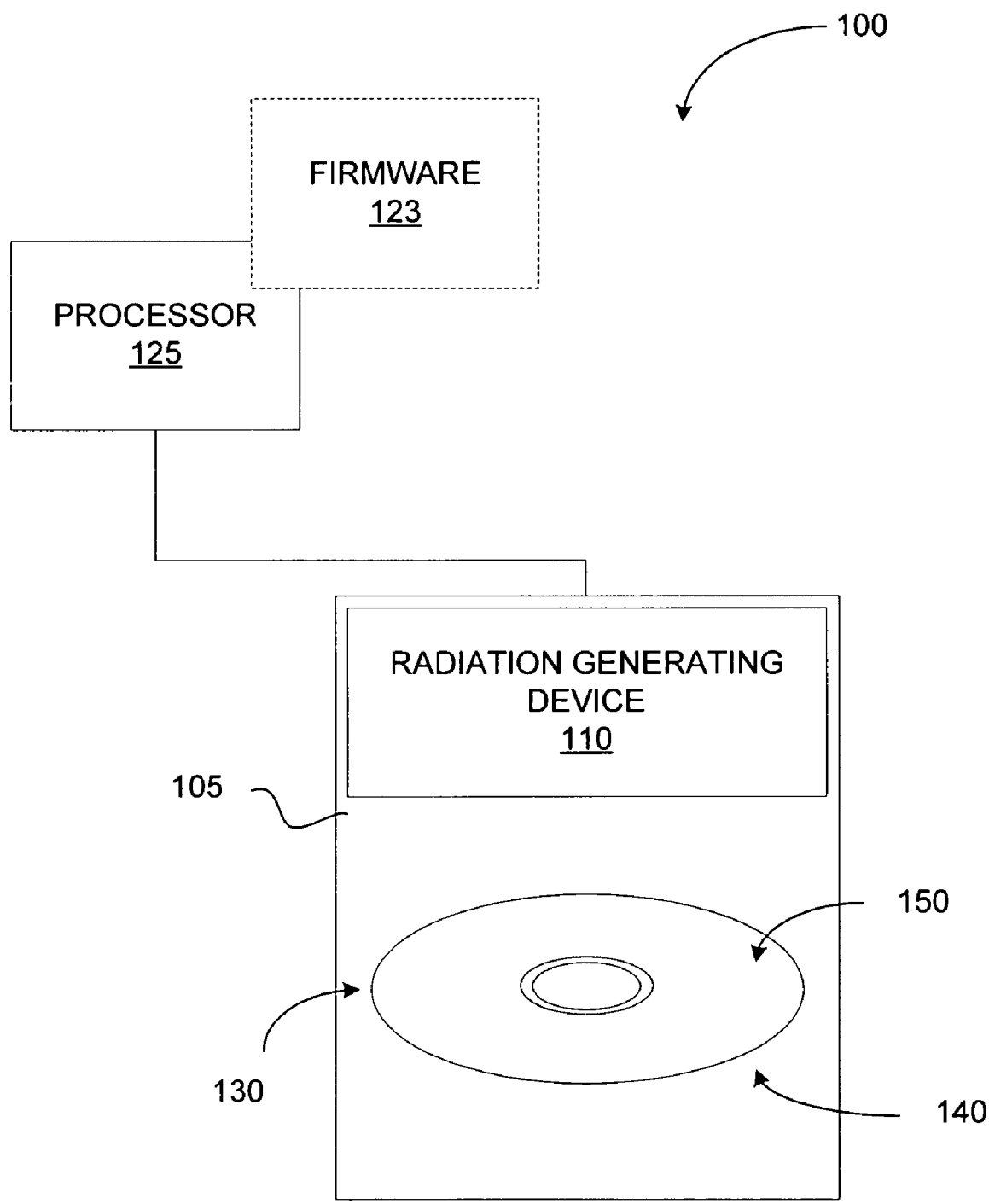
FIG. 1 illustrates a schematic view of a media processing system according to one exemplary embodiment.

FIG. 1 illustrates a schematic view of a media processing system (100), according to one exemplary embodiment. As will be described in more detail below, the illustrated media processing system (100) allows a user, among other things, to expose a radiation image-able surface with coatings of the present exemplary compositions, register an image on the coatings, and use the imaged object for a variety of purposes. For example, according to one exemplary embodiment, a radiation image-able data storage medium (radiation image-able disc) may be inserted into the media processing system (100) to have data stored and/or a graphic image formed thereon. As used herein, for ease of explanation only, the present dual band radiation image-able thermochromic coating will be described in the context of coating an optical disk such as a compact disk (CD) or a digital video disk (DVD). However, it will be understood that the present dual band radiation image-able thermochromic coating may be applied to any number of desired substrates including, but in no way limited to, polymers, papers, metal, glass, ceramics, and the like.

As illustrated in FIG. 1, the media processing system (100) includes a housing (105) that houses a radiation generating device (110), which may be controllably coupled to a processor (125). The operation of the radiation generating device (110) may be controlled by the processor (125) and firmware (123) configured to selectively direct the operation of the radiation generating device. The exemplary media processing system (100) also includes hardware (not shown), such as spindles, motors, and the like, for placing a radiation image-able disc (130) in optical communication with the radiation generating device (110). The operation of the hardware (not shown) may also be controlled by firmware (123) accessible by the processor (125). The above-mentioned components will be described in further detail below.

As illustrated in FIG. 1, the media processing system (100) includes a processor (125) having firmware (123) associated therewith. As shown, the processor (125) and firmware (123) are shown communicatively coupled to the radiation generating device (110), according to one exemplary embodiment. Exemplary processors (125) that may be associated with the present media processing system (100) may include, without limitation, a personal computer (PC), a personal digital assistant (PDA), an MP3 player, or other such device. According to one exemplary embodiment, any suitable processor may be used, including, but in no way limited to a processor configured to reside directly on the media processing system. Additionally, as graphically shown in FIG. 1, the processor (125) may have firmware (123) such as software or other drivers associated therewith, configured to control the operation of the radiation generating device (110) to selectively apply radiation to the data storage medium (130). According to one exemplary embodiment, the firmware (123) configured to control the operation of the radiation generating device (110) may be stored on a data storage device (not shown) communicatively coupled to the processor (125) including, but in no way limited to, read only memory (ROM), random access memory (RAM), and the like.

As introduced, the processor (125) is configured to controllably interact with the radiation generating device (110). While FIG. 1 illustrates a single radiation generating device (110), any number of radiation generating devices may be incorporated in the media processing system (100). According to one exemplary embodiment, the radiation generating device (110) may include, but is in no way limited to a plurality of lasers configured for forming data on a CD and/or DVD, such as in a combo CD/DVD recording drive. More specifically, a combo CD/DVD recording drive configured to record on more than one type of media may be incorporated by the media processing system (100). For example, a DVD-R/RW (+/−) combo drive is also capable of recording CD-R/RW for example. In order to facilitate recording on more than one type of media, these combo CD/DVD recording drives include more than one laser. For example combo CD/DVD recording drives often contain 2 recording lasers: a first laser operating at approximately 780 nm for CD recordings and a second laser operating at approximately 650 nm for DVD recordings. Accordingly, the present media processing system (100) may include any number of lasers having wavelengths that may vary from between approximately 200 nm to approximately 1200 nm.

As mentioned previously, the present media processing system (100) includes a data storage medium in the form of a radiation imageable disk (130) disposed adjacent to the radiation generating device (110). According to one exemplary embodiment, the exemplary radiation image-able disc (130) includes first (140) and second (150) opposing sides. The first side (140) has a data surface formed thereon configured to store data while the second side (150) includes a radiation image-able surface having a dual band color forming composition.

With respect to the first side (140) of the radiation image-able disk (130), the radiation generating device (110) may be configured to read existing data stored on the radiation image-able disk (130) and/or to store new data on the radiation image-able disc (130), as is well known in the art. As used herein, the term "data" is meant to be understood broadly as including the non-graphic information digitally or otherwise embedded on a radiation imageable disc. According to the present exemplary embodiment, data can include, but is in no way limited to, audio information, video information, photographic information, software information, and the like. Alternatively, the term "data" may also be used herein to describe information such as instructions a computer or other processor may access to form a graphic display on a radiation image-able surface.

In contrast to the first side of the radiation image-able disk (130), the second side of the radiation image-able disk (140) includes a two-phase radiation image-able coating exhibiting improved marking sensitivity and shelf-life reliability compared to traditional image-able coatings. According to one exemplary embodiment, discussed in further detail below, the second side of the radiation image-able disk (140) includes two separate phases: a first phase including a radiation-curable polymer matrix with an acidic activator species dissolved therein, and a second phase including a low-melting eutectic of a leuco-dye insoluble in the polymer matrix but uniformly distributed therein as a fine dispersion. Additionally, two or more antenna dyes are dispersed and/or dissolved in the two phases of the coating. Further details of the radiation-curable radiation image-able coating exhibiting both marking sensitivity and good shelf-life reliability will be provided below.

Exemplary Coating Formulation

As mentioned above, the second side of the radiation imageable disk (140) includes a number of components forming two separate phases configured to be imaged by one or more lasers emitting radiation at a known wavelength. According to one exemplary embodiment, the two separate phases forming the present coating formulation include, but are in no way limited to, a radiation-curable polymer matrix with acidic activator species dissolved therein and a low-melting eutectic of a leuco-dye insoluble in the matrix but uniformly distributed therein as a fine dispersion. Additionally, the coating formulation is sensitized by the inclusion of a hybrid antenna dye package uniformly distributed/dissolved in at least one and preferably both phase(s) of the coating. If the present hybrid antenna dye package is present in only one phase, image formation may be enhanced by distributing the hybrid antenna dye package in the radiation-curable polymer matrix phase. According to one exemplary embodiment, the present hybrid antenna dye package includes at least two dyes, at least one dye having a high radiation absorbance due to a high extinction coefficient and at least a second dye having a robust fade resistance and generally good stability quite often associated with lower extinction coefficient. Each of the present phases will be described in detail below.

As mentioned, the first phase of the dual band radiation imageable thermochromic coating includes, but is in no way limited to, a radiation-curable polymer matrix with acidic activator species dissolved therein. According to one exemplary embodiment, the radiation curable pre-polymer, in the form of monomers or oligomers, may be a lacquer configured to form a continuous phase, referred to herein as a matrix phase, when exposed to light having a specific wavelength. More specifically, according to one exemplary embodiment, the radiation curable polymer may include, by way of example, UV-curable matrices such as acrylate derivatives, oligomers, and monomers, with a photo package. A photo package may include a light absorbing species, such as photoinitiators, which initiate reactions for curing of the lacquer, such as, by way of example, benzophenone derivatives. Other examples of photoinitiators for free radical polymerization monomers and oligomers include, but are not limited to, thioxanethone derivatives, anthraquinone derivatives, acetophenones, benzoine ethers, and the like.

According to one exemplary embodiment, the radiation-curable polymer matrix phase may be chosen such that curing is initiated by a form of radiation that does not cause a color change of the color-former present in the coating, according to the present exemplary system and method. For example, the radiation-curable polymer matrix may be chosen such that the above-mentioned photo package initiates reactions for curing of the lacquer when exposed to a light having a different wavelength than that of the leuco dyes. Matrices based on cationic polymerization resins may require photoinitiators based on aromatic diazonium salts, aromatic halonium salts, aromatic sulfonium salts and metallocene compounds. A suitable lacquer or matrix may also include Nor-Cote CLCDG-1250A (a mixture of UV curable acrylate monomers and oligomers) which contains a photoinitiator and organic solvent acrylates. Other suitable components for lacquers or matrices may include, but are not limited to, acrylated polyester oligomers, such as CN293 and CN294 as well as CN-292 (low viscosity polyester acrylate oligomer), trimethylolpropane triacrylate commercially known as SR-351, isodecyl acrylate commercially known as SR-395, and 2(2-ethoxyethoxy)ethyl acrylate commercially known as SR-256, all of which are commercially available from Sartomer Co.

Additionally, a number of acidic developers may be dispersed/dissolved in the present radiation curable polymer matrix. According to one exemplary embodiment, the acidic developers present in the radiation curable polymer matrix may include a phenolic species capable of developing color when reacting with a leuco dye and soluble or partially soluble in the coating matrix phase. Suitable developers for use with the present exemplary system and method include, but are in no way limited to, acidic phenolic compounds such as, for example, Bis-Phenol A, p-Hydroxy Benzyl Benzoate, Bisphenol S (4,4-Dihydroxydiphenyl Sulfone), 2,4-Dihydroxydiphenyl Sulfone, Bis(4-hydroxy-3-allylphenyl) sulfone (Trade name—TG-SA), 4-Hydroxyphenyl-4'-isopropoxyphenyl sulfone (Trade name—D8). The acidic developer may be either completely or at least partially dissolved in the UV-curable matrix.

The second phase of the present two-phase radiation imageable thermochromic coating with improved marking sensitivity and shelf-life reliability is a color-former phase including, according to one exemplary embodiment, a leuco-dye and/or leuco-dye alloy, further referred to herein as a leuco-phase. According to one exemplary embodiment, the leuco-phase is present in the form of small particles dispersed uniformly in the exemplary coating formulation. According to one exemplary embodiment, the leuco-phase includes leuco-dye or alloy of leuco-dye with a mixing aid configured to form a lower melting eutectic with the leuco-dye. Alternatively, according to one embodiment, the second phase of the present radiation curable polymer matrix may include other color forming dyes such as photochromic dyes.

According to one exemplary embodiment, the present two-phase radiation image-able thermochromic coating may have any number of leuco dyes including, but in no way limited to, fluorans, phthalides, amino-triarylmethanes, aminoxanthenes, aminothioxanthenes, amino-9,10-dihydro-acridines, aminophenoxazines, aminophenothiazines, aminodihydrophenazines, aminodiphenylmethanes, aminohydrocinnamic acids (cyanoethanes, leuco methines) and corresponding esters, 2(phydroxyphenyl)-4,5-diphenylimidazoles, indanones, leuco indamines, hydrozines, leuco indigoid dyes, amino-2,3-dihydroanthraquinones, tetrahalop, p'-biphenols, 2(p-hydroxyphenyl)-4,5-diphenylimidazoles, phenethylanilines, and mixtures thereof. According to one particular aspect of the present exemplary system and method, the leuco dye can be a fluoran, phthalide, aminotriarylmethane, or mixture thereof. Several nonlimiting examples of suitable fluoran based leuco dyes include, but are in no way limited to, 3-diethylamino-6-methyl-7-anilinofluorane, 3-(N-ethyl-p-toluidino)-6-methyl-7-anilinofluorane, 3-(N-ethyl-N-isoamylamino)-6-methyl-7-anilinofluorane, 3-diethylamino-6-methyl-7-(o,p-dimethylanilino)fluorane, 3-pyrrolidino-6-methyl-7-anilinofluorane, 3-piperidino-6-methyl-7-anilinofluorane, 3-(N-cyclohexyl-N methylamino)-6-methyl-7-anilinofluorane, 3-diethylamino-7-(mtrifluoromethylanilino) fluorane, 3-dibutylamino-6-methyl-7-anilinofluorane, 3-diethylamino-6-chloro-7-anilinofluorane, 3-dibutylamino-7-(o-chloroanilino) fluorane, 3-diethylamino-7-(o-chloroanilino)fluorane, 3-di-n-pentylamino-6-methyl-7-anilinofluoran, 3-di-n-butylamino-6-methyl-7-anilinofluoran, 3-(n-ethyln-isopentylamino)-6-methyl-7-anilinofluoran, 3-pyrrolidino-6-methyl-7-anilinofluoran, 1(3H)-isobenzofuranone, 4,5,6,7-tetrachloro-3,3-bis[2-[4-(dimethylamino)phenyl]-2-(4-methoxyphenyl)ethenyl], and mixtures thereof.

Aminotriarylmethane leuco dyes can also be used in the present invention such as tris(N,N-dimethylaminophenyl) methane (LCV); tris(N,N-diethylaminophenyl)methane (LECV); tris(N,N-di-n-propylaminophenyl) methane (LPCV); tris(N,N-dinbutylaminophenyl) methane (LBCV); bis(4-diethylaminophenyl)-(4-diethylamino-2-methyl-phenyl) methane (LV-1); bis(4-diethylamino-2-methylphenyl)-(4-diethylamino-phenyl) methane (LV-2); tris(4-diethylamino-2-methylphenyl) methane (LV-3); bis(4-diethylamino-2-methylphenyl)(3,4-dimethoxyphenyl) methane (LB-8); aminotriarylmethane leuco dyes having different alkyl substituents bonded to the amino moieties wherein each alkyl group is independently selected from C1-C4 alkyl; and aminotriaryl methane leuco dyes with any of the preceding named structures that are further substituted with one or more alkyl groups on the aryl rings wherein the latter alkyl groups are independently selected from C1-C3 alkyl.

Additional leuco dyes can also be used in connection with the present exemplary systems and methods and are known to those skilled in the art. A more detailed discussion of appropriate leuco dyes may be found in U.S. Pat. Nos. 3,658,543 and 6,251,571, each of which are hereby incorporated by reference in their entireties. Additionally examples may be found in Chemistry and Applications of Leuco Dyes, Muthyala, Ramaiha, ed.; Plenum Press, New York, London; ISBN: 0-306-45459-9, incorporated herein by reference.

Further, according to one exemplary embodiment, a number of melting aids may be included with the above-mentioned leuco dyes. As used herein, the melting aids may include, but are in no way limited to, crystalline organic solids with melting temperatures in the range of approximately 50° C. to approximately 150° C., and preferably having melting temperature in the range of about 70° C. to about 120° C. In addition to aiding in the dissolution of the leuco-dye and the antenna dye, the above-mentioned melting aid may also assist in reducing the melting temperature of the leuco-dye and stabilize the leuco-dye alloy in the amorphous state, or slow down the re-crystallization of the leuco-dye alloy into individual components. Suitable melting aids include, but are in no way limited to, aromatic hydrocarbons (or their derivatives) that provide good solvent characteristics for leuco-dye and antenna dyes used in the present exemplary systems and methods. By way of example, suitable melting aids for use in the current exemplary systems and methods include, but are not limited to, m-terphenyl, pbenzyl biphenyl, alpha-naphtol benzylether, 1,2[bis(3,4]dimethylphenyl)ethane. In some embodiments, the percent of leuco dyes or other color-former and melting aid can be adjusted to minimize the melting temperature of the color-former phase without interfering with the development properties of the leuco dye. When used, the melting aid can comprise from approximately 2 wt % to approximately 25 wt % of the color-former phase.

According to one embodiment of the present exemplary system and method, the above-mentioned leuco-phase is uniformly dispersed or distributed in the matrix phase as a separate phase. In other words, at ambient temperature, the leuco phase is practically insoluble in matrix phase. Consequently, the leuco-dye and the acidic developer component of the matrix phase are contained in the separate phases and can not react with color formation at ambient temperature. However, upon heating with laser radiation, both phases melt and mix. Once mixed together, color is developed due to a reaction between the fluoran leuco dye and the acidic developer. According to one exemplary embodiment, when the leuco dye and the acidic developer melt and react, proton transfer from the developer opens a lactone ring of the leuco-dye, resulting in an extension of conjugate double bond system and color formation.

While the above-mentioned color formation is desired, the formation of the color is further controlled and facilitated by sensitizing the various phases of the resulting coating to a known radiation emission wavelength via the use of a plurality of antenna dyes, thereby providing maximum heating efficiency. According to one exemplary embodiment, the antenna dyes comprise a number of radiation absorbers configured to optimize development of the color forming composition upon exposure to radiation at a predetermined exposure time, energy level, wavelength, etc. More specifically, the radiation absorbing antenna dyes may act as an energy antenna providing energy to surrounding areas of the resulting coating upon interaction with an energy source of a known wavelength. Once energy is received by the radiation absorbing antenna dyes, the radiation is converted to heat to melt portions of the coating and selectively induce image formation. However, radiation absorbing dyes have varying absorption ranges and varying absorbency maximums where the antenna dye will provide energy most efficiently from a radiation source. Generally speaking, a radiation antenna that has a maximum light absorption at or in the vicinity of a desired development wavelength may be suitable for use in the present system and method.

As a predetermined amount and frequency of radiation is generated by the radiation generating device (110) of the media processing system (100), matching the radiation absorbing energy antenna to the radiation wavelengths and intensities of the first and second radiation generating devices can optimize the image formation system. Optimizing the system includes a process of selecting components of the color forming composition that can result in a rapidly developable composition under a fixed period of exposure to radiation at a specified power.

According to one exemplary embodiment, the present two-phase radiation image-able coating having improved marking sensitivity and shelf-life reliability includes a hybrid antenna package uniformly distributed/dissolved in at least one and preferably both phase(s) of the coating including two or more antenna dyes that may be divided into two groups. According to the present exemplary embodiment, the two or more antenna dyes included in the present hybrid antenna package may be selected from a number of radiation absorbers such as, but not limited to, aluminum quinoline complexes, porphyrins, porphins, indocyanine dyes, phenoxazine derivatives, phthalocyanine dyes, polymethyl indolium dyes, polymethine dyes, guaiazulenyl dyes, croconium dyes, polymethine indolium dyes, metal complex IR dyes, cyanine dyes, squarylium dyes, chalcogeno-pyryloarylidene dyes, indolizine dyes, pyrylium dyes, quinoid dyes, quinone dyes, azo dyes, and mixtures or derivatives thereof. Other suitable antennas can also be used in the present exemplary system and method and are known to those skilled in the art and can be found in such references as "Infrared Absorbing Dyes", Matsuoka, Masaru, ed., Plenum Press, New York, 1990 (ISBN 0-306-43478-4) and "Near-Infrared Dyes for High Technology Applications", Daehne, Resch-Genger, Wolfbeis, Kluwer Academic Publishers (ISBN 0-7923-5101-0), both incorporated herein by reference.

According to the present exemplary embodiment, the two or more antenna dyes included in the present hybrid antenna package may be separated into a high sensitivity/lower stability dye group or a lower sensitivity/high stability dye group. According to one exemplary embodiment, the antenna dyes may be classified as either high sensitivity or low sensitivity according to the extinction coefficient of the antenna dye. As used herein, the term high sensitivity/lower stability dye shall be understood to mean an antenna dye having an extinction coefficient greater than approximately 100000 L Mol$^{-1}$ Cm$^{-1}$. Similarly, according to one exemplary embodiment, the term low sensitivity/higher stability dye shall be understood to mean an antenna dye having an extinction coefficient less than approximately 1000000 L Mol$^{-1}$ Cm$^{-1}$. In addition to providing a hybrid antenna package having both antenna dyes of high sensitivity/lower stability and antenna dyes of low sensitivity/higher stability, the antenna dyes of the hybrid antenna package have absorbance maximums approximately matching the wavelength of the radiation generating device (110). According to one exemplary embodiment, the media processing system (100) may include a radiation generating device configured to produce one or more lasers with wavelength values of approximately 650 nm, approximately 780 nm, and/or approximately 300 nm to approximately 600 nm. By matching the wavelength values of the radiation generating device(s) (110), image formation is maximized.

As mentioned, a number of dyes having varying absorbance maximums may be used in the above-mentioned coatings to act as radiation absorbing antenna dyes. Generally speaking, antenna dyes of cyanine and porphyrin typically exhibit high sensitivity/lower stability radiation characteristics while naphthalocyanines typically exhibit low sensitivity/higher stability characteristics.

According to one exemplary embodiment, high sensitivity/lower stability radiation absorbing antenna dyes having absorbance maximums at approximately 780 nm that may be incorporated into the present antenna dye package include, but are in no way limited to, many indocyanine IR-dyes such as IR780 iodide (Aldrich 42,531-1) (1) (3H-Indolium, 2-[2-[2-chloro-3-[(1,3-dihydro-3,3-dimethyl-1-propyl-2H-indol-2-ylidene)ethylidene]-1-cyclohexen-1-yl]ethenyl]-3,3-dimethyl-1-propyl-, iodide (9CI)), IR783 (Aldrich 54,329-2) (2) (2-[2-[2-Chloro-3-[2-[1,3-dihydro-3,3-dimethyl-1-(4-sulfobutyl)-2Hindol-2-ylidene]-ethylidene]-1-cyclohexen-1-yl]-ethenyl]-3,3-dimethyl-1-(4-sulfobutyl)-3H-indolium hydroxide, inner salt sodium salt) Additionally, low sensitivity/higher stability dyes having absorbance maximums at approximately 780 nm may be used including, but in no way limited to NIR phthalocyanine or substituted phthalocyanine dyes such as Cirrus 715 dye from Avecia, YKR186, and YKR3020 from Yamamoto chemicals Similarly, high sensitivity/lower stability radiation absorbing antenna dyes having absorbance maximums at approximately 650 nm that may be incorporated into the present antenna dye package include, but are in no way limited to, many indolium of phenoxazine dyes and cyanine dyes such as cyanine dye CS172491-72-4. Additionally, low sensitivity/higher stability dyes having absorbance maximums at approximately 650 nm may be used including, but in no way limited to many commercially available phthalocyanine dyes such as pigment blue 15.

Further, radiation absorbing antenna dyes having absorbance maximums at approximately 650 nm that may be incorporated into the present antenna dye package according to their extinction coefficient include, but are in no way limited to, dye 724 (3H-Indolium, 2-[5-(1,3-dihydro-3,3-dimethyl-1-propyl-2H-indol-2-ylidene)-1,3-pentadienyl]-3,3-dimethyl-1-propyl-, iodide) ($\lambda$ max=642 nm), dye 683 (3H-Indolium, 1-butyl-2-[5-(1-butyl-1,3-dihydro-3,3-dimethyl-2H-indol-2-ylidene)-1,3-pentadienyl]-3,3-dimethyl-, perchlorate ($\lambda$ max=642 nm), dyes derived from phenoxazine such as Oxazine 1 (Phenoxazin-5-ium, 3,7-bis(diethylamino)-, perchlorate) ($\lambda$ max=645 nm), available from "Organica Feinchemie GmbH Wollen." Appropriate antenna dyes applicable to the present exemplary system and method may also include but are not limited to phthalocyanine dyes with light absorption maximum at/or in the vicinity of 650 nm.

Moreover, high sensitivity/lower stability radiation absorbing antenna dyes having absorbance maximums at approximately 405 nm that may be incorporated into the present antenna dye package include, but are in no way limited to, cyanine and porphyrin dyes such as etioporphyrin 1 (CAS 448-71-5). Additionally, low sensitivity/higher stability dyes having absorbance maximums at approximately 405 nm may be used including, but in no way limited to, phthalocyanines and naphthalocyanines such as ethyl 7-diethylaminocoumarin-3-carboxylate ($\lambda$ max=418 nm).

Radiation antennae which can be incorporated into the present antenna dye package according to their extinction coefficient for optimization in the blue (~405 nm) and indigo wavelengths can include, but are in no way limited to, aluminum quinoline complexes, porphyrins, porphins, and mixtures or derivatives thereof. Non-limiting specific examples of suitable radiation antenna can include 1-(2-chloro-5-sulfophenyl)-3-methyl-4-(4-sulfophenyl)azo-2-pyrazolin-5-one disodium salt ($\lambda$ max=400 nm); ethyl 7-diethylaminocoumarin-3-carboxylate ($\lambda$ max=418 nm); 3,3'-diethylthiacyanine ethylsulfate ($\lambda$ max=424 nm); 3-allyl-5-(3-ethyl-4-methyl-2-thiazolinylidene)rhodanine ($\lambda$ max=430 nm) (each available from Organica Feinchemie GmbH Wolfen), and mixtures thereof.

Non-limiting specific examples of suitable aluminum quinoline complexes can include tris(8-hydroxyquinolinato) aluminum (CAS 2085-33-8), and derivatives such as tris(5-cholor-8-hydroxyquinolinato)aluminum (CAS 4154-66-1), 2-(4-(1-methyl-ethyl)-phenyl)-6-phenyl-4H-thiopyran-4-ylidene)-propanedinitril-1,1-dioxide (CAS 174493-15-3), 4,4'-[1,4-phenylenebis(1,3,4-oxadiazole-5,2-diyl)]bis N,N-diphenyl benzeneamine (CAS 184101-38-0), bis-tetraethylammonium-bis(1,2-dicyano-dithiolto)-zinc(II) (CAS 21312-70-9), 2-(4,5-dihydronaphtho[1,2-d]-1,3-dithiol-2-ylidene)-4,5-dihydro-naphtho[1,2-d]1,3-dithiole, all available from Syntec GmbH.

Non-limiting examples of specific porphyrin and porphyrin derivatives can include etioporphyrin 1 (CAS 448-71-5), deuteroporphyrin IX 2,4 bis ethylene glycol (D630-9) available from Frontier Scientific, and octaethyl porphrin (CAS 2683-82-1), azo dyes such as Mordant Orange (CAS 2243-76-7), Merthyl Yellow (CAS 60-11-7), 4-phenylazoaniline (CAS 60-09-3), Alcian Yellow (CAS 61968-76-1), available from Aldrich chemical company, and mixtures thereof. Exemplary methods of forming the above-mentioned coating, as well as methods for forming images on the coating are described in further detail below.

Exemplary Coating Forming Method

Figure 2:
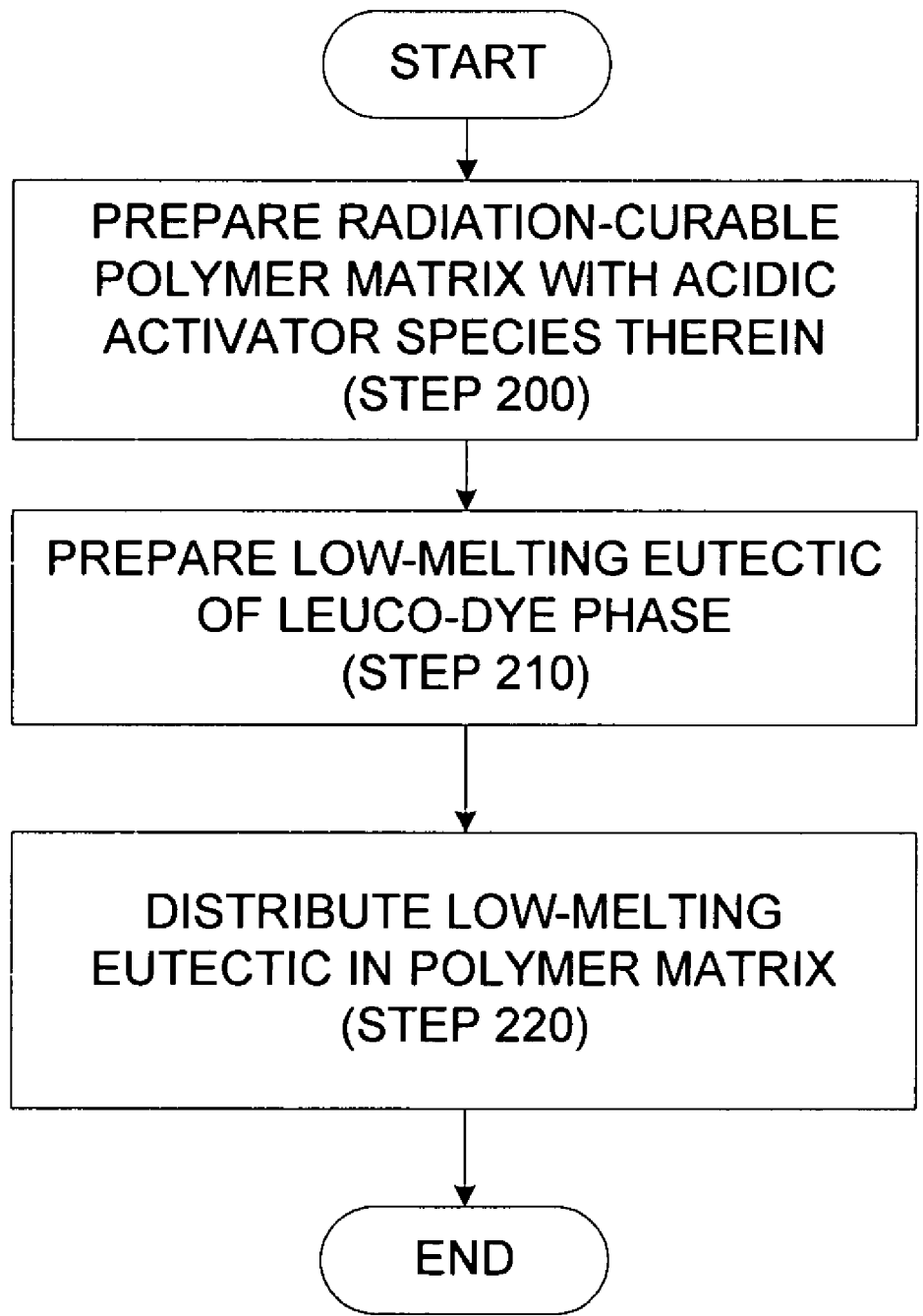
FIG. 2 is a flowchart illustrating a method of forming an imageable composition according to one exemplary embodiment.

FIG. 2 is a flowchart illustrating a method of forming the present two-phase radiation image-able thermochromic coating, according to one exemplary embodiment. In general, a method of forming the image-able thermochromic coating includes preparing the radiation-curable polymer matrix with an acidic activator species dissolved therein (step 200), preparing a low-melting eutectic of a leuco-dye (step 210), and evenly distributing the low-melting eutectic of a leuco-dye in the radiation curable polymer matrix (step 220). Further details of the exemplary coating forming method will now be described in further detail below with reference to FIGS. 3 and 4.

Figure 3:
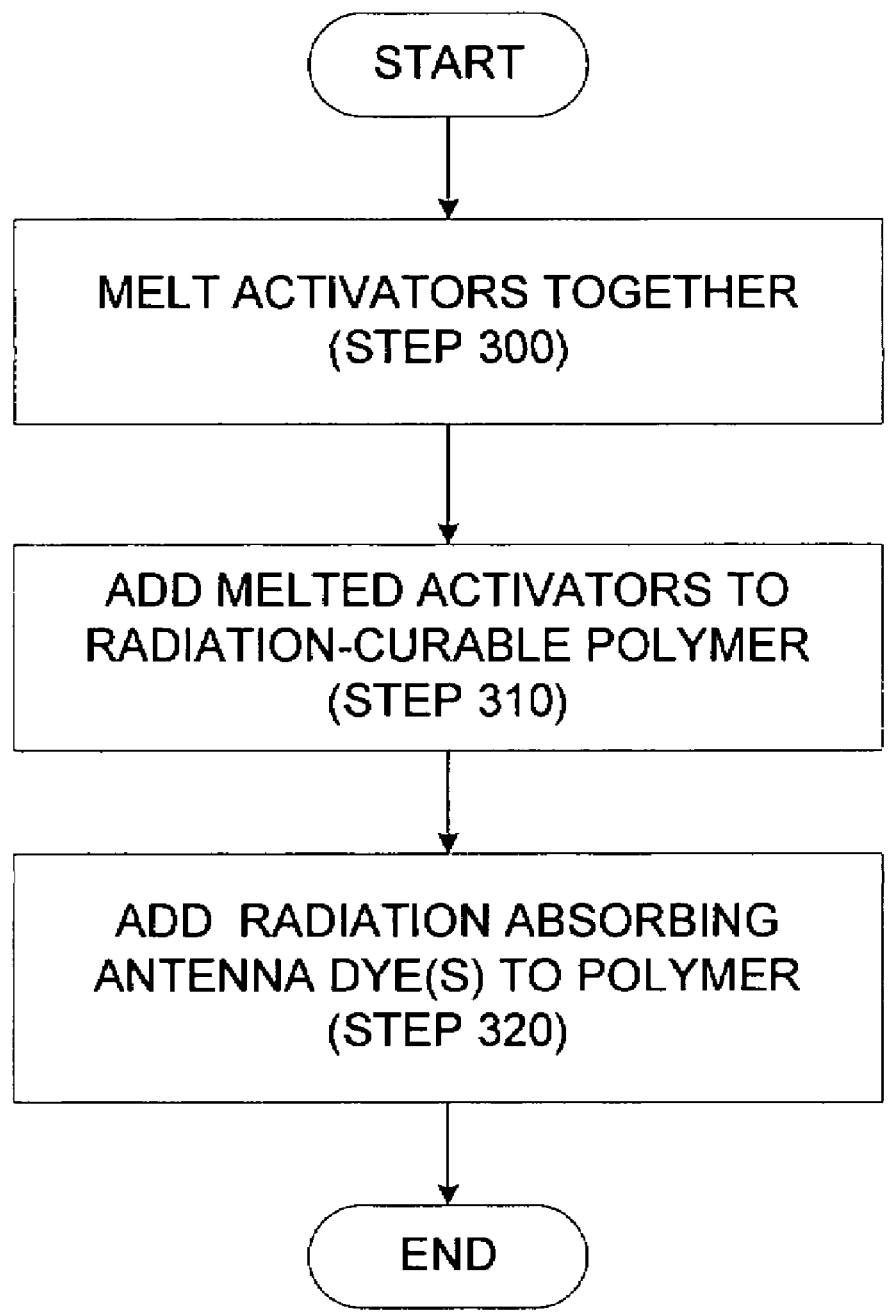
FIG. 3 is a flowchart illustrating a method for forming a radiation image-able composition, according to one exemplary embodiment.
Figure 4:
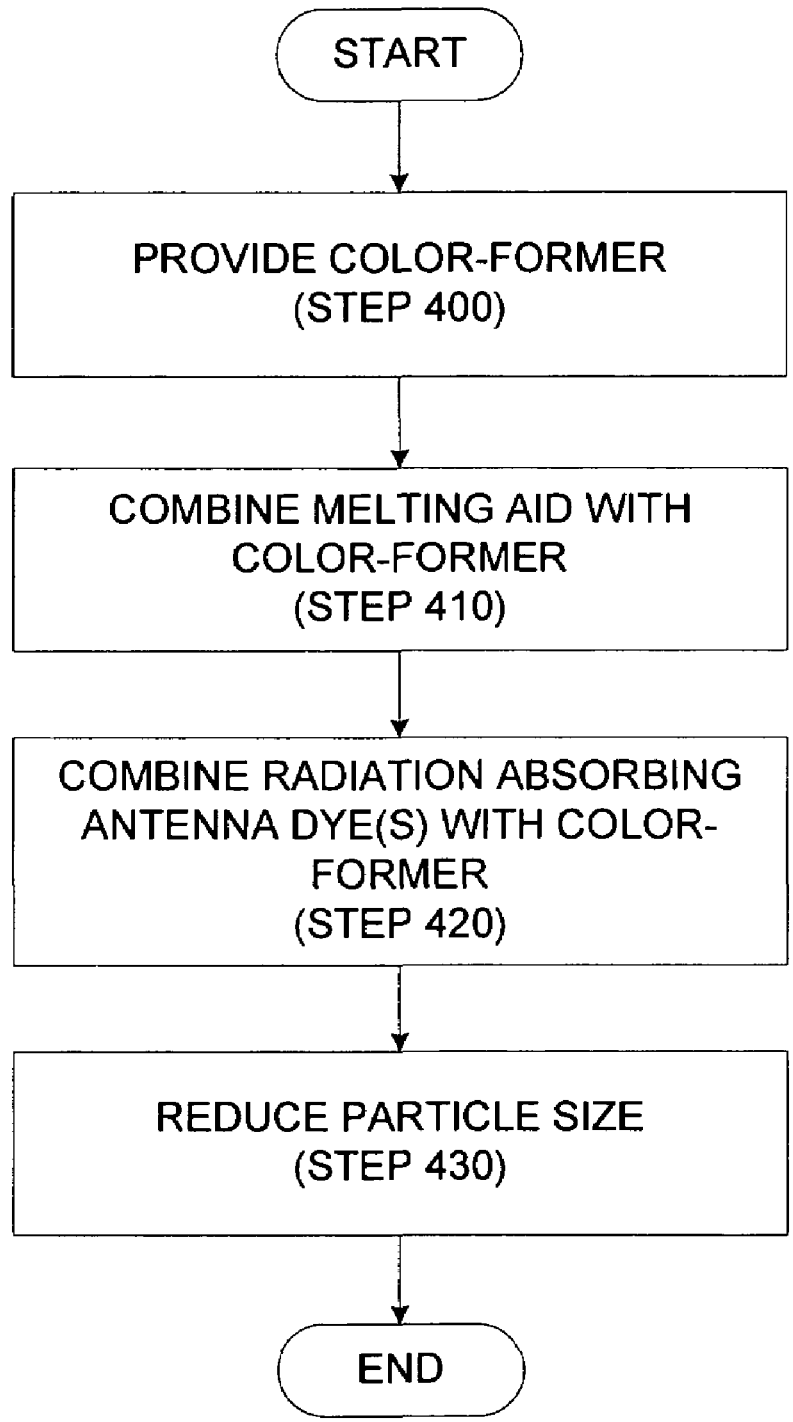
FIG. 4 is a flow chart illustrating a method for forming a radiation image-able composition, according to one exemplary embodiment.

As mentioned with reference to FIG. 2, a first step of the present exemplary coating formation method includes preparing the radiation-curable polymer matrix with an acidic activator species therein (step 200). FIG. 3 further illustrates an exemplary method for preparing the radiation-curable polymer matrix, according to one exemplary embodiment. As illustrated in FIG. 3, the radiation-curable polymer matrix may be prepared by first melting the acidic, proton-donating activator species together (step 300). In some embodiments, multiple activators can be used, e.g., multiple activator systems having coequal performance values to systems having a primary activator and secondary activator(s). While the present exemplary method includes the step of melting the activators together to accelerate dissolution of activator species that may exhibit poor solubility in the radiation curable polymer, the step of melting the activators together is optional. Rather, in many cases, the activators may be directly dissolved in the radiation-curable polymer without preliminary melting.

Once the desired activators have been optionally melted together (step 300), the melted activators are added to the radiation-curable polymer (step 310). According to one exemplary embodiment, the proton-donating activator species are dissolved into the radiation-curable polymer. Dissolution of the proton-donating activator species may be facilitated by the introduction of agitation into the radiation-curable polymer. Dissolution of the proton-donating activator species in the radiation-curable polymer (step 310) will provide for a substantially even distribution of the activators throughout the polymer.

Once the desired activators have been dissolved in the radiation curable polymer (step 310), one or more radiation absorbing antenna dyes are added to the radiation-curable polymer (step 320). According to the present exemplary method, the above-mentioned hybrid antenna package may be introduced to the two phases of the present exemplary coating according to three different methodologies. According to a first exemplary embodiment, the antenna dyes with very high laser radiation absorbance (extinction coefficient) and, typically, not very good photo-stability may be dissolved/uniformly distributed in the coating polymer matrix phase. According to this first exemplary embodiment, antenna dyes with lower laser radiation absorbance (extinction coefficient) but good photo-stability forming the second component of the hybrid antenna dye package may be dissolved/uniformly distributed in the leuco-dye phase.

According to a second exemplary embodiment, the antenna dyes of the hybrid antenna package may be distributed with the antenna dyes with very high laser radiation absorbance (extinction coefficient) and, typically, not very good photo-stability dissolved/uniformly distributed in the leuco-dye phase. According to this second exemplary embodiment, the antenna dyes with lower laser radiation absorbance (extinction coefficient) but good photo-stability may be dissolved/uniformly distributed in the coating polymer matrix phase.

According to yet a third exemplary embodiment, the antenna dyes of both antenna dye groups may be uniformly distributed and/or dissolved in both phases of the thermochromic coating. Regardless of the antenna dye distribution, the selected antenna dyes may be selected as having absorbance maximums associated with the wavelength(s) of the radiation generating device(s) (110). According to one exemplary embodiment, the antenna dyes are dissolved into the various phases to provide a substantially even distribution thereof.

Once the radiation-curable polymer matrix is formed (step 200; FIG. 2), a low-melting eutectic of the leuco dye phase may also be formed (step 210; FIG. 2). According to one exemplary embodiment illustrated in FIG. 4, the leuco dye phase is formed by first providing the color-former (step 400). As mentioned previously, the color-former may include, but is in no way limited to, leuco-dye and/or leco-dye alloy. As used herein, the term "color-former" refers to any composition that changes color upon application of energy. Color-formers may include, but are in no way limited to, leuco dyes, photochromic dyes, or the like. For example, the color-former may include leuco dyes, such as fluoran, isobenzofuran, and phthalide-type leuco dyes. The term "color-former" does not infer that color is generated from scratch, as it includes materials that can change in color, as well as materials that can become colored from a colorless or more transparent state or a different color. The resulting molten mixture may be referred to as a molten color-former phase. Additionally, according to one exemplary embodiment, a melting aid may be combined with the above-mentioned color-former (step 410). The melting aid may be a crystalline organic solid melted with the color-former, according to one exemplary embodiment. Melting aids are typically crystalline organic solids that can be melted and mixed with a particular color-former. For example, most color-formers are also available as a solid particulate that is soluble in standard liquid solvents. Thus, the color-former and melting aid can be mixed and heated to form a molten mixture. Upon cooling, a color-former phase of color-former and melting aid is formed that can then be ground into a powder.

When the color-former and the melting aid are combined (step 410), one or more radiation absorbing dyes may also be mixed with the color-former (step 420), according to one exemplary embodiment. As mentioned previously, the radiation absorbing dyes that are mixed with the color-former may be selected based on the wavelength or range of wavelengths produced by the radiation generating device(s).

Additionally, as mentioned previously, the radiation absorbing dyes that are mixed with the color-former may be mixed according to one of three different embodiments. According to a first exemplary embodiment, the antenna dyes with very high laser radiation absorbance (extinction coefficient) and, typically, not very good photo-stability may be dissolved/uniformly distributed in the coating polymer matrix phase and the antenna dyes with lower laser radiation absorbance (extinction coefficient) but good photo-stability forming the second component of the hybrid antenna dye package may be dissolved/uniformly distributed in the leuco-dye phase. According to a second exemplary embodiment, the antenna dyes with very high laser radiation absorbance (extinction coefficient) and, typically, not very good photo-stability dissolved/uniformly distributed in the leuco-dye phase, while the antenna dyes with lower laser radiation absorbance (extinction coefficient) but good photo-stability may be dissolved/uniformly distributed in the coating polymer matrix phase. According to yet a third exemplary embodiment, the antenna dyes of both antenna dye groups are uniformly distributed and/or dissolved in both phases of the thermochromic coating. While the present exemplary method includes a plurality of radiation absorbing dyes in each of the two phases, it will be appreciated that the radiation absorbing antenna dyes can be present in either or both of the various phases.

Once the above-mentioned components are melted, the molten low-melting eutectic of the leuco dye phase is allowed to cool and the particle size of the low-melting eutectic of the leuco dye phase is reduced (step 430). The particle size of the low-melting eutectic of the leuco dye phase may be reduced by any number of known methods including, but in no way limited to, milling and/or grinding.

Returning again to the method illustrated in FIG. 2, once both the radiation-curable polymer matrix and the low-melting eutectic of the leuco-dye phase are formed, the low melting eutectic is distributed in the polymer matrix (step 220). According to one exemplary embodiment, the low-melting eutectic of the leuco-dye phase may be distributed in the polymer with the aid of continuous agitation during introduction of the low melting eutectic in the polymer matrix.

When the two-phase radiation image-able thermochromic coating is formed as described above, it may be applied to any number of desired substrates including, but in no way limited to, polymer, paper, ceramic, glass, metal, and the like. According to one exemplary embodiment, the dual band radiation image-able thermochromic coating may be applied to a desired substrate using any number of known coating systems and methods including, but in no way limited to, doctor blade coating, gravure coating, reverse roll coating, meyer rod coating, extrusion coating, curtain coating, air knife coating, and the like.

Figure 5:
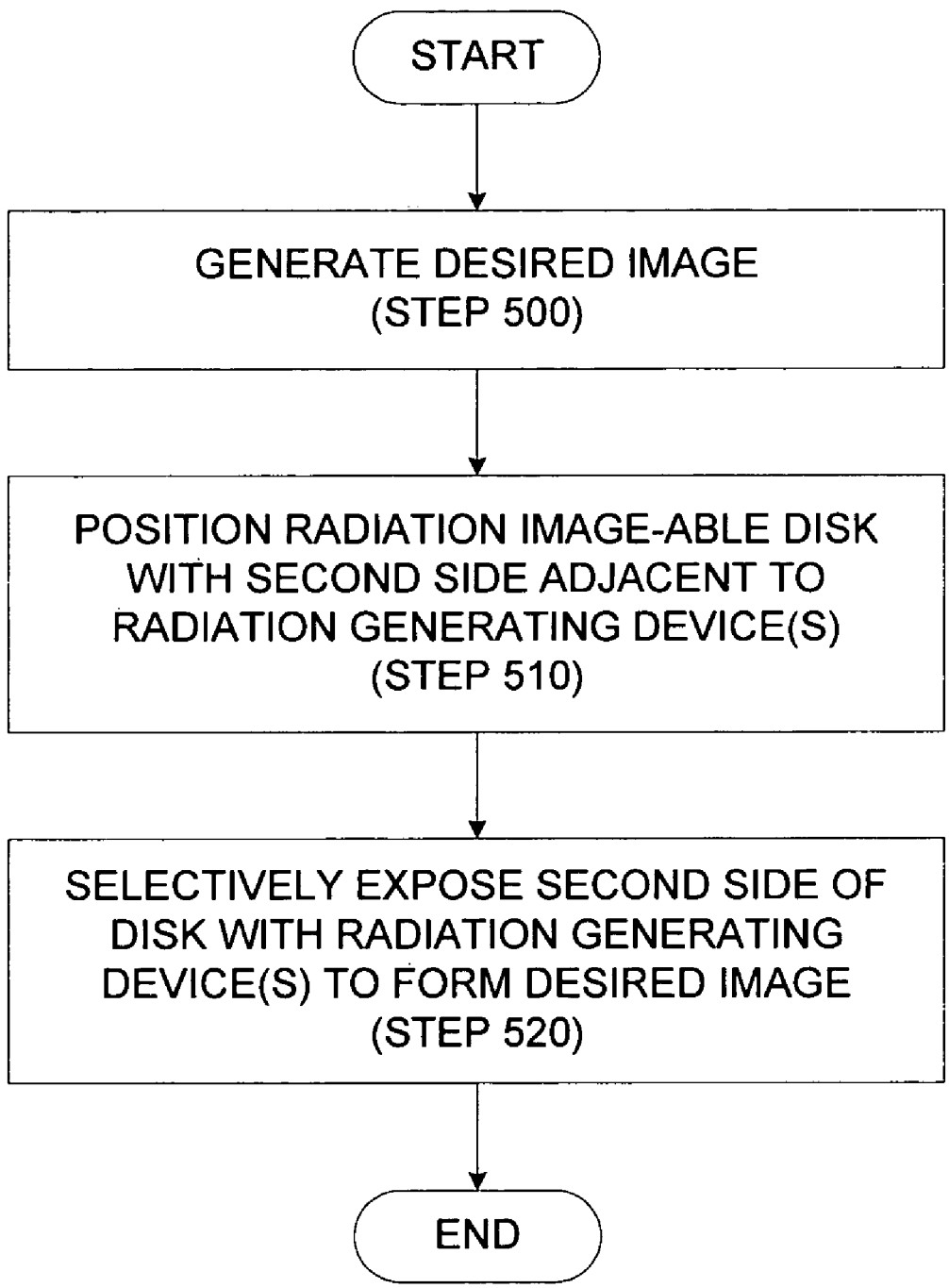
FIG. 5 is a flow chart illustrating a method for forming an image on a radiation image-able coating, according to one exemplary embodiment.

Once the above-mentioned coating is formed on a radiation image-able disk (130; FIG. 1), data may be formed on the data surface of the first side (140), and/or a desired image may be formed via selective radiation exposure on the second side (150). FIG. 5 illustrates one exemplary method for forming a desired image on the second side (150) of the radiation image-able disk (130), according to one exemplary embodiment. As illustrated in FIG. 5, the image formation method begins by first generating the desired image (step 500). According to one exemplary embodiment, generating the desired image may include forming a graphical representation of the desired image using any number of user interfaces and converting the graphical representation into a number of machine controllable commands using the firmware (123; FIG. 1) and/or the processor (125; FIG. 1) of the media processing system (100; FIG. 1).

Continuing with FIG. 5, the radiation image-able disk may then be placed adjacent to the radiation generating device(s) (110; FIG. 1) with the radiation image-able coating in optical communication with the radiation generating device(s) (step 510). With the radiation image-able coating in optical communication with the radiation generating device(s) (step 510), the radiation image-able coating may then be selectively exposed to the radiation generating device(s) to form the desired image (step 520).

According to the present exemplary embodiment, the two-phase radiation image-able thermochromic coating made with the above-mentioned hybrid antenna package exhibits improved marking sensitivity and shelf-life reliability when compared to traditional image-able thermochromic coatings. More specifically, the present two-phase radiation exhibits a high marking sensitivity once formed due to the presence of the high extinction coefficient/lower stability antenna dye. Additionally, due to the presence of the lower extinction coefficient/higher stability antenna dye, sufficient marking sensitivity may be maintained in the coating even after exposure to ambient light for long periods of time.

The preceding description has been presented only to illustrate and describe the present method and apparatus. It is not intended to be exhaustive or to limit the disclosure to any precise form disclosed. Many modifications and variations are possible in light of the above teaching. It is intended that the scope of the disclosure be defined by the following claims.

What is claimed is:

1. A radiation image-able coating, comprising:
    a first phase including a radiation curable polymer matrix and an activator disposed in said radiation curable polymer matrix;
    a second phase insolubly distributed in said first phase, said second phase including a color-former; and
    a hybrid antenna dye package distributed in at least one of said first and second phase, wherein said hybrid antenna dye package includes at least a first antenna dye having a high extinction coefficient and a second antenna dye having a low extinction coefficient.

2. The coating of claim 1, wherein said antenna dye package is distributed in both said first phase and said second phase.

3. The coating of claim 1, wherein said color-former comprises a low-melting eutectic of one of a leuco-dye or a leuco-dye alloy.

4. The coating of claim 3, wherein said color-former comprises a low-melting eutectic of a fluorane leuco-dye.

5. The coating of claim 1, wherein both said first antenna dye and said second antenna dye of said hybrid antenna dye package have an absorbance maximum wavelength comprising one of approximately 780 nm, approximately 650 nm, or approximately 405 nm.

6. The coating of claim 1, wherein:
    said first antenna dye has an extinction coefficient greater than approximately 100,000 L $M^{-1}$ $cm^{-1}$; and
    said second antenna dye has an extinction coefficient less than approximately 100,000 L $M^{-1}$ $cm^{-1}$.

7. The coating of claim 1, wherein said activator comprises an acidic activator species dissolved in said first phase.

8. The coating of claim 1, wherein said second phase comprises a dispersion within said first phase.

9. The coating of claim 1, wherein said second phase further comprises a melting aid configured to decrease the melting temperature of said eutectic.

10. A method of forming a radiation image-able coating comprising:
    preparing a radiation-curable polymer matrix including an acidic activator species;
    forming a low-melting eutectic of a leuco-dye phase;
    distributing said low-melting eutectic of a leuco-dye phase in said polymer matrix; and
    sensitizing said radiation image-able coating with a hybrid antenna dye package, wherein said hybrid antenna dye package includes at least a first antenna dye having a high extinction coefficient and a second antenna dye having a low extinction coefficient.

11. The method of claim 10, wherein said sensitizing said radiation image-able coating with a hybrid antenna dye package further comprises distributing said hybrid antenna dye package in said radiation-curable polymer matrix.

12. The method of claim 10, wherein said sensitizing said radiation image-able coating with a hybrid antenna dye package further comprises distributing said antenna dye package in said low-melting eutectic of a leuco-dye phase.

13. The method of claim 10, further comprising selecting said hybrid antenna dye package to have an absorbance maximum wavelength to correspond to a radiation generating device having a wavelength of approximately 780 nm.

14. The method of claim 10, further comprising selecting said hybrid antenna dye package to have an absorbance maximum wavelength to correspond to a radiation generating device having a wavelength of approximately 650 nm.

15. The method of claim 10, further comprising selecting said hybrid antenna dye package to have an absorbance maximum wavelength to correspond to a radiation generating device having a wavelength of approximately 405 nm.

16. The method of claim 10, wherein said preparing a radiation-curable polymer matrix including an acidic activator species comprises:
    melting a plurality of acidic activator species; and
    adding said melted activators to a radiation-curable polymer.

17. The method of claim 16, further comprising adding one of said first antenna dye having a high extinction coefficient or said second antenna dye having a low extinction coefficient to said radiation-curable polymer.

18. The method of claim 10, wherein said forming a low-melting eutectic of a leuco-dye phase comprises:
    providing a color-former;
    combining a melting aid with said color-former.

19. The method of claim 18, further comprising adding one of said first antenna dye having a high extinction coefficient or said second antenna dye having a low extinction coefficient to said color-former.

20. The method of claim 18, further comprising reducing a particle size of said color-former.

21. The method of claim 10, wherein:
said first antenna dye has an extinction coefficient greater than approximately 100,000 L Mol$^{-1}$ cm$^{-1}$; and
said second antenna dye has an extinction coefficient less than approximately 100,000 L Mol$^{-1}$ cm$^{-1}$.

22. A method of forming an image on a substrate comprising:
forming a radiation image-able coating on a desired substrate, wherein said radiation image-able coating includes a first phase including a radiation curable polymer matrix and an activator disposed in said radiation curable polymer matrix, a second phase insolubly distributed in said first phase, said second phase including a color-former, and a hybrid antenna dye package distributed in at least one of said first and second phase, wherein said hybrid antenna dye package includes at least a first antenna dye having a high extinction coefficient and a second antenna dye having a low extinction coefficient; and
selectively exposing said radiation image-able coating to at least one radiation source, wherein said radiation source has a wavelength associated with an absorbance maximum wavelength of said hybrid antenna dye package.

23. The method of claim 22, wherein said hybrid antenna dye package is distributed in both said first phase and said second phase.

24. The method of claim 22, wherein said radiation source comprises a laser having a wavelength of one of approximately 780 nm, approximately 650 nm, or approximately 405 nm.

25. The method of claim 22, wherein:
said first antenna dye has an extinction coefficient greater than approximately 100,000 L Mol$^{-1}$ cm$^{-1}$; and
said second antenna dye has an extinction coefficient less than approximately 100,000 L Mol$^{-1}$ cm$^{-1}$.

26. The method of claim 22, wherein said first antenna dye is distributed in said first phase and said second antenna dye is distributed in said second phase.

27. The method of claim 22, wherein said second antenna dye is distributed in said first phase and said first antenna dye distributed in said second phase.

28. A system for forming an image on a substrate, comprising:
a radiation generating device configured to generate radiation having a first wavelength;
a substrate disposed adjacent to said radiation generating device; and
a radiation image-able coating disposed on said substrate, wherein said radiation image-able coating includes a first phase including a radiation curable polymer matrix and an activator disposed in said radiation curable polymer matrix, a second phase insolubly distributed in said first phase, said second phase including a color-former, and a hybrid antenna dye package distributed in at least one of said first and second phase, wherein said antenna dye package includes at least a first antenna dye having high extinction coefficient and a second antenna dye having a low extinction coefficient.

29. The system of claim 28, wherein said antenna dye package is distributed in both said first phase and said second phase.

30. The system of claim 28, wherein said color-former comprises a low-melting eutectic of one of a leuco-dye or a leuco-dye alloy.

* * * * *

UNITED STATES PATENT AND TRADEMARK OFFICE
CERTIFICATE OF CORRECTION

PATENT NO. : 7,514,198 B2  Page 1 of 1
APPLICATION NO. : 11/204831
DATED : April 7, 2009
INVENTOR(S) : Vladek Kasperchik et al.

It is certified that error appears in the above-identified patent and that said Letters Patent is hereby corrected as shown below:

In column 9, line 24, delete "(9CI)" and insert -- (9Cl) --, therefor.

Signed and Sealed this

Twenty-eighth Day of September, 2010

David J. Kappos
*Director of the United States Patent and Trademark Office*